US008433336B2

(12) United States Patent
Lee et al.

(10) Patent No.: US 8,433,336 B2
(45) Date of Patent: Apr. 30, 2013

(54) METHOD FOR GUIDING ROUTE USING AUGMENTED REALITY AND MOBILE TERMINAL USING THE SAME

(75) Inventors: Taesung Lee, Gyeonggi-Do (KR); Eunkyung Kim, Gyeonggi-Do (KR); Taehyun Lim, Gyeonggi-Do (KR); Jooil Lee, Gyeonggi-Do (KR); Hyesook Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 116 days.

(21) Appl. No.: 12/942,942

(22) Filed: Nov. 9, 2010

(65) Prior Publication Data

US 2011/0300876 A1  Dec. 8, 2011

(30) Foreign Application Priority Data

Jun. 8, 2010 (KR) .......................... 10-2010-0054017

(51) Int. Cl.
*H04Q 7/20* (2006.01)
(52) U.S. Cl.
USPC .................. 455/456.1; 455/456.5; 455/456.6; 701/400

(58) Field of Classification Search ............... 455/456.1, 455/456, 5, 456.6, 456.5; 701/209, 40
See application file for complete search history.

(56) References Cited

U.S. PATENT DOCUMENTS

| 2005/0197767 | A1* | 9/2005 | Nortrup ......................... 701/209 |
| 2009/0005076 | A1* | 1/2009 | Forstall et al. ............. 455/456.2 |
| 2009/0157310 | A1* | 6/2009 | Nortrup ......................... 701/209 |
| 2010/0309225 | A1* | 12/2010 | Gray et al. .................... 345/633 |

* cited by examiner

*Primary Examiner* — Danh Le
(74) *Attorney, Agent, or Firm* — Birch, Stewart, Kolasch & Birch, LLP

(57) ABSTRACT

Disclosed are a method for guiding a route by using augmented reality and a mobile terminal using the same. The method for guiding a route by a mobile terminal includes: receiving route source information from a first terminal; displaying a surrounding image of the first terminal including augmented reality (AR) information by a second terminal based on the received route source information; and providing, by the second terminal, a real time route guidance to the first terminal according to a user input with respect to the displayed surrounding image.

16 Claims, 11 Drawing Sheets

METHOD FOR GUIDING ROUTE USING AUGMENTED REALITY AND MOBILE TERMINAL USING THE SAME

CROSS-REFERENCE TO RELATED APPLICATIONS

This application claims priority to Korean Application No. 10-2010-0054017, filed Jun. 8, 2010, which is herein incorporated by reference in its entirety.

BACKGROUND OF THE INVENTION

1. Field of the Invention

The present invention relates to a method for guiding a route using augmented reality and a mobile terminal using the same.

2. Description of the Background Art

In general, terminals may be divided into a mobile or portable terminal and a stationary terminal according to whether or not terminals are movable. In addition, mobile terminals may be divided into a handheld terminal and a vehicle mount terminal according to whether or not users can directly carry it around.

As the functions of terminals are becoming more diverse, terminals can support more complicated functions such as capturing images or video, reproducing music or video files, playing games, receiving broadcast signals, and the like. By comprehensively and collectively implementing such functions, mobile terminals are embodied in the form of a multimedia player or device. In order to support and increase functions of the terminals, improvement of structural part and/or software part of terminals may be considered.

In general, there are conventional terminals capable of guiding a route (e.g., road guidance or other direction information). These terminals provide a route guidance to a destination based on geographical features and objects modeled based on stored geographical information (map information). Meanwhile, an augmented reality (AR) technique is applied such that, when a mobile terminal provides GPS information and/or terrestrial magnetism information to a server, the server determines the location and/or direction of the mobile terminal and provides guide information (AR information) regarding a subject whose images are captured by a camera of the mobile terminal.

Augmented reality (AR) is a term for a live direct or indirect view of a physical real-world environment whose elements are augmented by virtual computer-generated imagery. AR enhances one's current perception of reality. In the case of Augmented Reality, the augmentation is conventionally in real-time and in semantic context with environmental elements, such as sports scores on TV during a match. With the help of advanced AR technology (e.g. adding computer vision and object recognition) the information about the surrounding real world of the user becomes interactive and digitally usable. Artificial information about the environment and the objects in it can be stored and retrieved as an information layer on top of the real world view.

However, the conventional route guiding method has problems in that because previously obtained contents are provided to a user in advance, subsequent alterations in a street or building cannot be quickly provided to the user, thus failing to provide accurate information to the user, and geographical information periodically updated by a service provider must be downloaded. In addition, in the conventional AR information service, if a location has not been registered to the server, the location cannot be set as a destination, making it difficult to provide direction information to an intended destination.

SUMMARY OF THE INVENTION

Therefore, in order to address the above matters, the various features described herein have been conceived.

An aspect of the present invention provides a method for effectively providing direction information to a target person by effectively recognizing the location and direction of the target person by using guide information or AR information.

According to an aspect of the present invention, there is provided a method for guiding a route by a mobile terminal, including: receiving route source information from a first terminal; displaying a surrounding image of the first terminal including augmented reality (AR) information by a second terminal based on the received route source information; and providing, by the second terminal, a real time route guidance to the first terminal according to a user input with respect to the displayed surrounding image.

According to another aspect of the present invention, there is provided a method for guiding a route by a mobile terminal, including: acquiring an image corresponding to a certain location arbitrarily set by a first terminal and direction information of the first terminal and augmented reality (AR) information from a server; selecting a guidepost location from the image including the AR information; transmitting, by the first terminal, the guidepost location information to a second terminal; and when it is informed that the second terminal has reached the guidepost location, providing, by the first terminal, a route guidance to the second terminal according to a user input with respect to the displayed image.

According to another aspect of the present invention, there is provided a mobile terminal including: a wireless communication unit receiving route source information from a first terminal; and a controller displaying a surrounding image of the first terminal including augmented reality (AR) information based on the received route source information and providing a real time route guidance to the first terminal according to a user input with respect to the displayed surrounding image.

According to another aspect of the present invention, there is provided a mobile terminal including: a sensing unit measuring the direction of a mobile terminal; a wireless communication unit transmitting guidepost location information to the first terminal; and a controller acquiring image and augmented reality (AR) information corresponding to an certain location arbitrarily set by the controller and the direction information measured by the sensing unit from a server, selecting a guidepost location from the image including the AR information, and providing a route guidance to the first terminal according to a user input with respect to the displayed image when it is informed that the first terminal has reached the guidepost location.

In the method for guiding a route and a mobile terminal using the same according to exemplary embodiments of the present invention, the location and direction of a counterpart can be effectively recognized by combining guide information based on an augmented reality (AR) technique with an actual image, thereby providing direction information to the counterpart.

The foregoing and other objects, features, aspects and advantages of the present invention will become more apparent from the following detailed description of the present invention when taken in conjunction with the accompanying drawings.

DETAILED DESCRIPTION OF THE INVENTION

Embodiments of the present invention will be described below in detail with reference to the accompanying drawings, where those components are rendered the same reference number that are the same or are in correspondence, regardless of the figure number, and redundant explanations are omitted. In describing the present invention, if a detailed explanation for a related known function or construction is considered to unnecessarily divert the gist of the present invention, such explanation has been omitted but would be understood by those skilled in the art. In the following description, usage of suffixes such as 'module', 'part' or 'unit' used for referring to elements is given merely to facilitate explanation of the present invention, without having any significant meaning by itself. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings.

Overall Configuration of a Mobile Terminal

The mobile terminal associated with the present invention may include mobile phones, smart phones, notebook computers, digital broadcast receivers, PDAs (Personal Digital Assistants), PMPs (Portable Multimedia Player), navigation devices, and the like. It would be understood by a person in the art that the configuration according to the embodiments of the present invention can be also applicable to the fixed types of terminals such as digital TVs, desk top computers, or the like, except for any elements especially configured for a mobile purpose.

Figure 1:
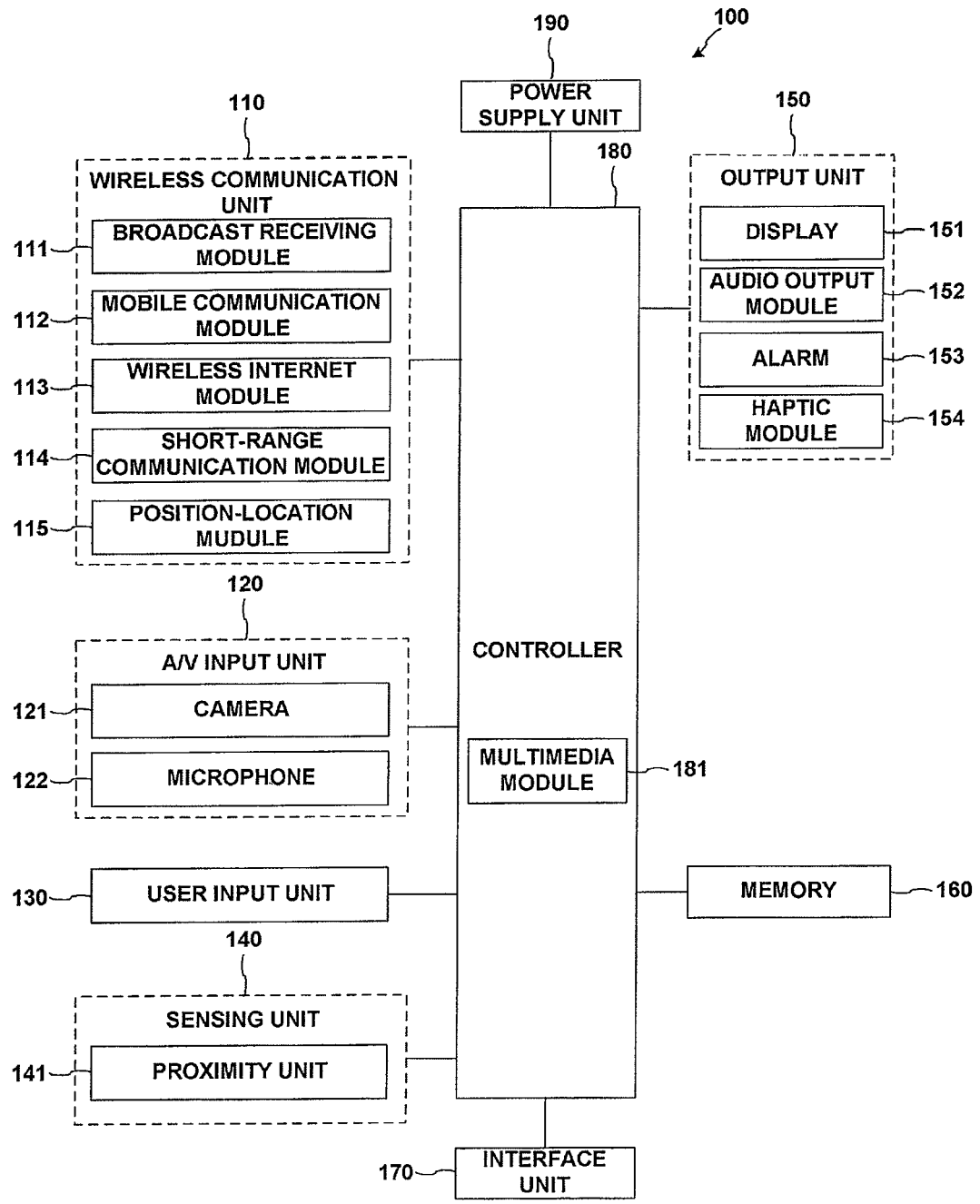
FIG. 1 is a schematic block diagram of a mobile terminal according to an exemplary embodiment of the present invention.

FIG. 1 is a schematic block diagram of a mobile terminal according to an embodiment of the present invention.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, and the like. FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more components allowing radio communication between the mobile terminal 100 and a wireless communication system or a network in which the mobile terminal is located. For example, the wireless communication unit 110 may include at least one of a broadcast receiving module 111, a mobile communication module 112, a wireless Internet module 113, a short-range communication module 114, and a position-location module 115.

The broadcast receiving module 111 receives broadcast signals and/or broadcast associated information from an external broadcast management server (or other network entity) via a broadcast channel. The broadcast associated information may refer to information associated with a broadcast channel, a broadcast program or a broadcast service provider. The broadcast associated information may also be provided via a mobile communication network and, in this case, the broadcast associated information may be received by the mobile communication module 112. Broadcast signals and/or broadcast-associated information received via the broadcast receiving module 111 may be stored in the memory 160 (or another type of storage medium).

The mobile communication module 112 transmits and/or receives radio signals to and/or from at least one of a base station (e.g., access point, Node B, and the like), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), LTE (Long Term Evolution), LTE-A (Long Term Evolution Advanced) or the like.

The short-range communication module 114 is a module for supporting short range communications. Some examples of short-range communication technology include BLUETOOTH, Radio Frequency IDentification (RFID), Infrared Data Association (IrDA), Ultra-WideBand (UWB), ZIGBEE, and the like.

The position-location module 115 is a module for checking or acquiring a location (or position) of the mobile terminal. A typical example of the position-location module is a GPS (Global Positioning System).

With reference to FIG. 1, the A/V input unit 120 receives an audio or image signal. The A/V input unit 120 may include a camera 121 (or other image capture device) or a microphone 122 (or other sound pick-up device). The camera 121 processes image frames of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate input data from commands entered by a user to control various operations of the mobile terminal. The user input unit 130 may include a keypad, a dome switch, a touch pad (e.g., a touch sensitive member that detects changes in resistance, pressure, capacitance, and the like, due to being contacted), a jog wheel, a jog switch, and the like.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, and the like, and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity unit 141.

The output unit 150 is configured to provide outputs in a visual, audible, and/or tactile manner (e.g., audio signal, image signal, alarm signal, vibration signal, etc.). The output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, and the like.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, an e-ink display, or the like.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units (or other display means) according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may convert pressure applied to a particular portion of the display unit 151 or a change in the capacitance or the like generated at a particular portion of the display unit 151 into an electrical input signal. The touch sensor may detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

With reference to FIG. 1, a proximity unit 141 may be disposed within or near the touch screen. The proximity unit 141 is a sensor for detecting the presence or absence of an object relative to a certain detection surface or an object that exists nearby by using the force of electromagnetism or infrared rays without a physical contact. Thus, the proximity unit 141 has a considerably longer life span compared with a contact type sensor, and it can be utilized for various purposes.

Examples of the proximity unit 141 may include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and the like. In case where the touch screen is the capacitance type, proximity of the pointer is detected by a change in electric field according to the proximity of the pointer. In this case, the touch screen (touch sensor) may be classified as a proximity unit.

The audio output module 152 may convert and output sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a receiver, a speaker, a buzzer, or other sound generating device.

The alarm unit 153 (or other type of user notification means) may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152. The display unit 151 and the audio output module 152 may be classified as a part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, and the like, an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or XD memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of person using the mobile terminal 100 and may include a user identity module (UIM), a subscriber identity module (SIM), a universal subscriber identity module (USIM), and the like. In addition, the device having the identification module (hereinafter referred to as 'identifying device') may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal 100. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Method for Processing User Input with Respect to Mobile Terminal

The user input units 130 is manipulated to receive a command for controlling the operation of the mobile terminal 100 and may include a plurality of manipulation units 131 and 132. The manipulation units 131 and 132 may be generally referred to as a manipulating portion, and various methods and techniques can be employed for the manipulation portion so long as they can be operated by the user in a tactile manner.

The display unit 151 can display various types of visual information. These information may be displayed in the form of characters, numerals, symbols, graphic or icons. In order to input such information, at least one of the characters, numerals, symbols, graphic and icons may be displayed in predetermined arrangement in the form of a keypad. Also, the keypad can be referred to as a 'soft key'.

The display unit 151 may be operated as an entire area or may be divided into a plurality of regions so as to be operated. In the latter case, the plurality of regions may be configured to be operated in association with each other.

For example, an output window and an input window may be displayed at an upper portion and a lower portion of the display unit 151. The output window and the input window are regions allocated to output or input information, respectively. Soft keys marked by numbers for inputting a phone number or the like may be outputted to the input window. When a soft key is touched, a number or the like corresponding to the touched soft key may be displayed on the output window. When the manipulation unit is manipulated, a call connection to the phone number displayed on the output window may be attempted or text displayed on the output window may be inputted to an application.

The display unit 151 or a touch pad may be configured to receive a touch through scrolling. The user can move an entity displayed on the display unit 151, for example, a cursor or a pointer positioned on an icon or the like, by scrolling the touch pad. In addition, when the user moves his finger on the display unit 151 or on the touch pad, a path along which the user's finger moves may be visually displayed on the display unit 151. This can be useful in editing an image displayed on the display unit 151.

A certain function of the terminal may be executed when the display unit 151 (touch screen) and the touch pad are touched together within a certain time range. For example, the display unit 151 and the touch pad may be touched together when the user clamps the terminal body by using his thumb and index fingers. The certain function may be activation or deactivation of the display unit 151 or the touch pad.

Exemplary embodiments related to a control method that can be implemented in the terminal configured as described above will now be described with reference to the accompanying drawings. The exemplary embodiments to be described may be solely used or may be combined to be used. Also, the exemplary embodiments to be described may be combined with the foregoing user interface (UI) so as to be used.

Method for Guiding Route Using Augmented Reality (AR) and Mobile Terminal Using the Same An exemplary embodiment of the present invention proposes a method in which when a target terminal transmits information indicating its location and/or direction to a guide terminal, the guide terminal provides a route guidance to a destination to the target terminal based on the transmitted information. Here, the information transmitted by the target terminal to the guide terminal may be at least one of image data captured by the target terminal, AR information, location information, and direction information. The location information may be GPS information, and the direction information may be azimuth information or terrestrial magnetism information.

In an exemplary embodiment of the present invention, when the location and/or direction of the target terminal is determined based on the information transmitted from the target terminal and, if necessary, AR information additionally acquired by the guide terminal from a server, the guide terminal can provide a route guidance to the target terminal through various guiding means. Here, the guiding means may be at least one of a voice, a message, graphic data, a memo, a touch input, a keypad input, an arrow input, and a symbol input.

For example, the user of the guide terminal may determine the location of the target terminal based on a surrounding image of the target terminal transmitted from the target terminal and AR information regarding key points in the surrounding image, and guide a route to a destination through a voice, a memo, and the like, to the user of the target terminal.

In the following description, it is assumed that one target terminal and one guide terminal are provided. However, the constitution of one target terminal and one guide terminal is proposed to explain an embodiment of the present invention and the technical idea of the present invention is not limited thereto. For example, an exemplary embodiment of the present invention can be applicable to a case in which a plurality of target terminals and one guide terminal are provided and the screen of the guide terminal is divided into a plurality of sections to provide a route guidance to the respective target terminals. In addition, an exemplary embodiment of the present invention can be also applicable to a case in which one target terminal and a plurality of guide terminals are provided and the target terminal appropriately combines route guidance from the respective guide terminals and outputs or displays the same.

A control method that can be implemented in a mobile terminal according to an exemplary embodiment of the present invention will now be described in detail according to types of information received by the guide terminal from the target terminal. In detail, the exemplary embodiments may be divided into a case (1) in which the guide terminal receives image data and AR information from the target terminal, a case (2) in which the guide terminal receives image data, location information, and direction information from the target terminal, a case (3) in which the guide terminal receives location information and direction information from the target terminal, and a case (4) in which the guide terminal receives only location information from the target terminal.

Here, the information may be transmitted only when there is a change in detection information (sensing information, sensor information) resulting from a location movement and/or direction changing of the target terminal, rather than being constantly transmitted from the target terminal to the guide terminal. The detection information may be at least one of GPS information, azimuth information, and terrestrial magnetism information.

Figure 2:
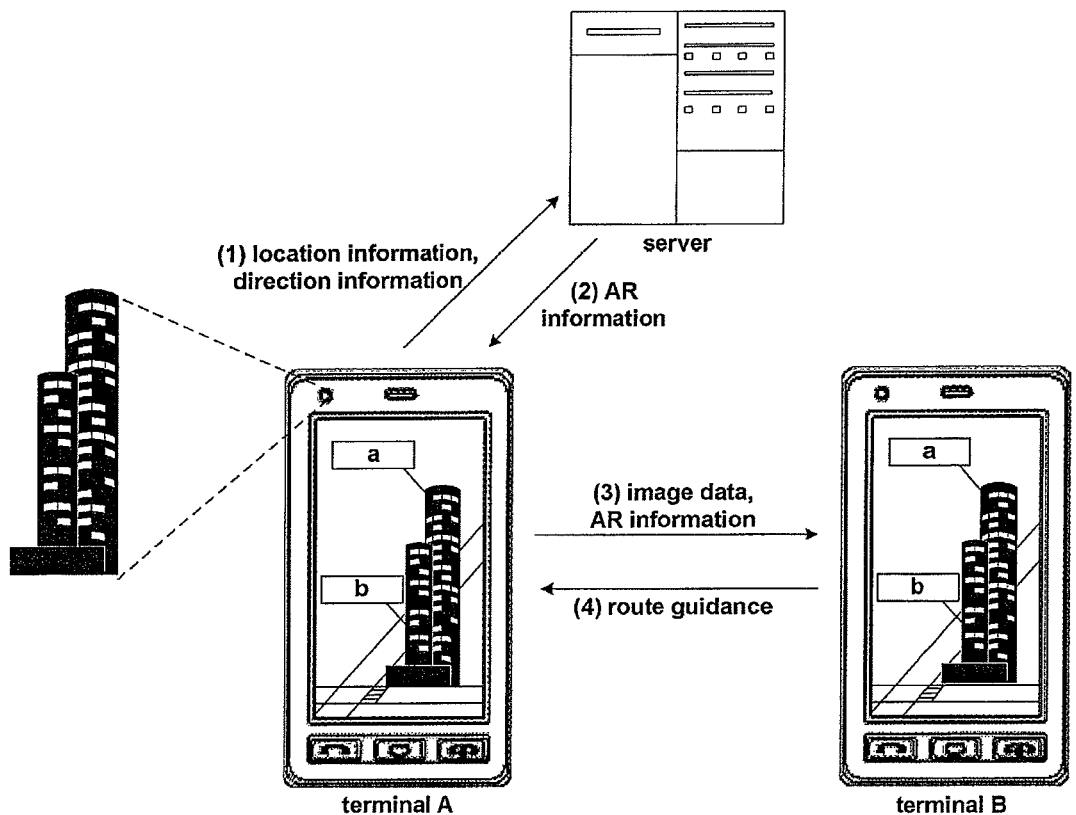
FIG. 2 is a view showing a first example of providing a route guidance by a mobile terminal according to an exemplary embodiment of the present invention.

(1) An Example where a Guide Terminal Receives Image Data and AR Information from a Target (i.e., to-be-Guided) Terminal FIG. 2 is a view showing a first example of providing a route guidance by a mobile terminal according to an exemplary embodiment of the present invention.

With reference to FIG. 2, a camera 121 of a terminal A (target terminal) processes image data (image frame) captured at a particular location and direction of the terminal A in a route guide mode or image capture mode. The processed image frame may be displayed on the display unit 151 of the terminal A.

A position-location module 115 of the terminal A acquires the location information (e.g., GPS information) of the terminal A, and a sensing unit 140 of the terminal A acquires direction information (e.g., azimuth information or terrestrial magnetism information) of the terminal A.

A wireless communication unit 110 of the terminal A transmits the location information and direction information of the terminal A to a certain server, and receives AR information corresponding to the location and direction of the terminal A from the server. The received AR information may be displayed on the display unit 151 of the terminal A along with the image frame captured at the location and direction. For example, as shown in FIG. 2, information boxes "a" and "b" are used to show AR information about the imaged buildings. However, the AR information is not necessarily limited to information about images displayed on the screen. The AR information may be any supplemental information related to terminal A's self-provided location information and direction information, regardless of whether or not a corresponding image is captured/displayed by terminal A.

The terminal A transmits the image data (image frame) corresponding to the location and direction and the AR information corresponding to the location and direction to a terminal B (guide terminal). In this case, the image data and AR information may be transmitted in such a form that the AR information is synthesized on the image frame (e.g., a captured image when the image frame and the AR information are simultaneously displayed on the display unit 151). For example, as shown in FIG. 2, information boxes "a" and "b" are used to show AR information about the imaged buildings.

The terminal B displays the image data and AR information received from the terminal A together on the display unit 151. And, the terminal B provides a route guidance to the target terminal through various guiding means. Here, the guiding means may be at least one of a voice, a message, graphic data, a memo, a touch input, a keypad input, an arrow input, and a symbol input.

In another variation of the embodiment of FIG. 2, terminal A sends terminal B's identification information to the server. Next, the AR information is sent to terminal B from the server. In this variation, the AR information may only be sent to terminal B or may be sent to both terminal A and terminal B. In either case, terminal B then uses the received AR information, as well as terminal A's image data and/or terminal A's location/direction information. Here, one or both of terminal A's image data and terminal A's location/direction information may be sent to terminal B directly from terminal A (as shown in FIG. 2) or via the server.

In another variation of the embodiment of FIG. 2, it is not necessary to send the image data from terminal A to terminal B. In this case, terminal B generates the route guidance information based on the received AR information.

Figure 3:
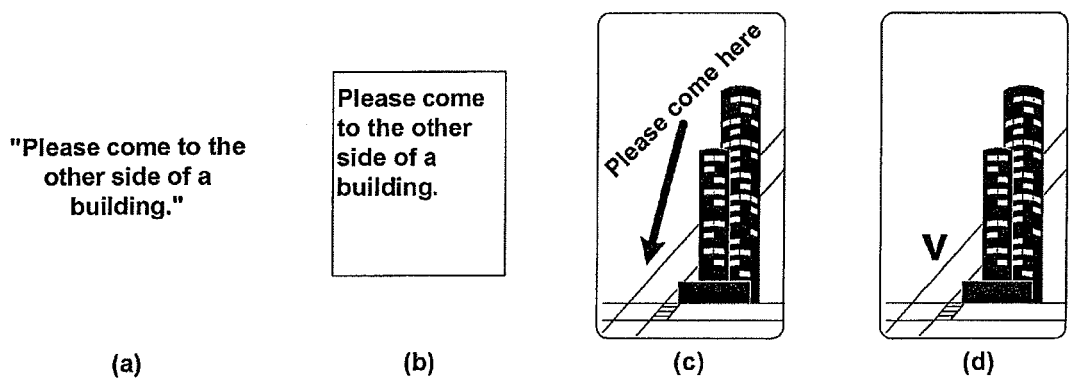
FIG. 3 is a view showing an example of a guiding unit for providing direction information by a mobile terminal according to an exemplary embodiment of the present invention.

FIG. 3 is a view showing an example of a guiding unit for providing direction information by a mobile terminal according to an exemplary embodiment of the present invention.

As shown in FIG. 3, the terminal B may transmit the user's voice (FIG. 3(*a*)) or a message (FIG. 3(*b*)) "Please come to the other side of a building" of the terminal B to the terminal A. The message may be created through a virtual keypad displayed on the display unit 151 (or a touch screen).

Also, as shown in FIG. 3, when the user of the terminal B inputs a memo "Please come here" and an arrow indicating a place on the display unit 151 (touch screen) of the terminal B, the terminal B may transmit graphic data with respect to the memo and the arrow to the terminal A and the terminal A may then display the graphic data on the display unit 151 (FIG. 3(*c*)). The terminal B may synthesize the memo and the arrow on the captured image transmitted by the terminal A and re-transmit the synthesized image to the terminal A.

Alternatively, as shown in FIG. 3, when the user of the terminal B inputs a symbol (v) indicating a place on the display unit 151 (touch screen), the terminal B transmits graphic data with respect to the symbol to the terminal A, and the terminal A may then display the graphic data on the display unit 151 (FIG. 3(*d*)). The terminal B may synthesize the symbol on the captured image transmitted from the terminal A and then transmit the synthesized image to the terminal A.

Figure 4:
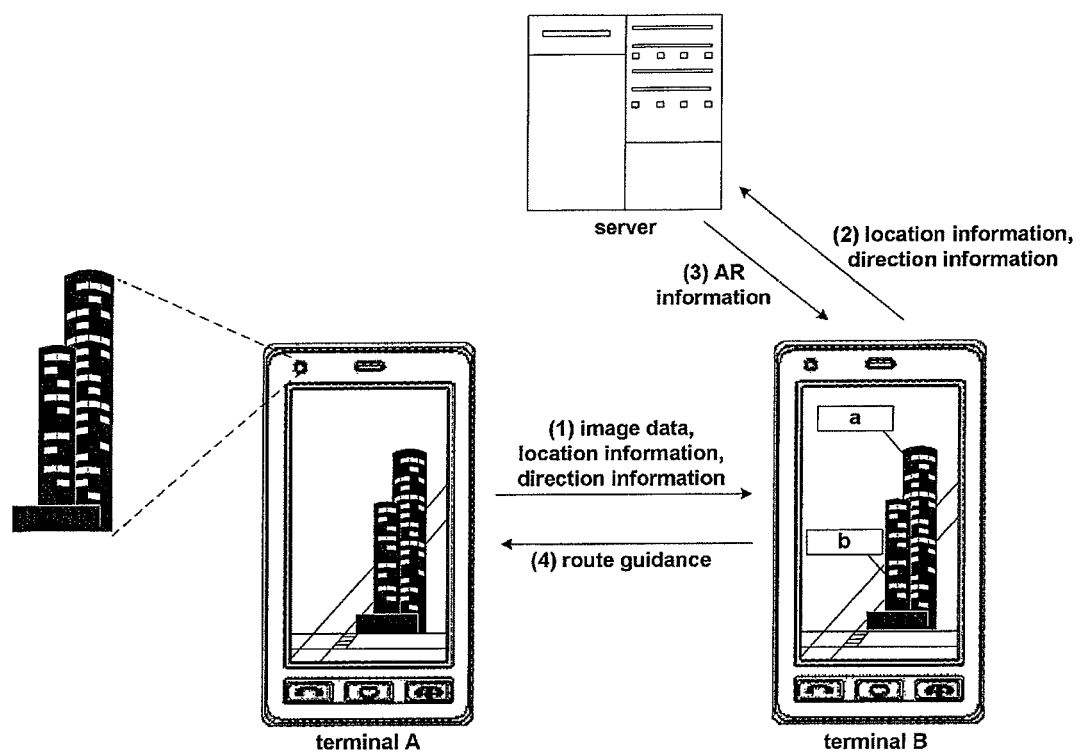
FIG. 4 is a view showing a second example of providing a route guidance by a mobile terminal according to an exemplary embodiment of the present invention.

(2) An Example where a Guide Terminal Receives Image Data, Location Information, and Direction Information from a Target (i.e., to-be-Guided) Terminal FIG. 4 is a view showing a second example of providing a route guidance by a mobile terminal according to an exemplary embodiment of the present invention.

With reference to FIG. 4, the camera 121 of the terminal A (target terminal) processes the image frame captured at the particular location and direction of the terminal A in the route guidance mode or image capture mode. The processed image frame may be displayed on the display unit 151 of the terminal A.

The position-location module 115 of the terminal A acquires the location information (e.g., GPS information) of the terminal A, and the sensing unit 140 of the terminal A acquires direction information (e.g., azimuth information or terrestrial magnetism information) of the terminal A.

The terminal A transmits the acquired image data (image frame), location information, and direction information to the terminal B (guide terminal).

The wireless communication unit 110 of the terminal B transmits the location information and direction information of the terminal A, which have been received from the terminal A, to a certain server, and receives AR information corresponding to the location and direction of the terminal A from the server.

The terminal B displays the image data received from the terminal A and the AR information received from the terminal A together on the display unit 151. And, the terminal B provides a route guidance to the target terminal through various guiding means. Here, the guiding means may be at least one of a voice, a message, graphic data, a memo, a touch input, a keypad input, an arrow input, and a symbol input. The guiding means may be similarly understood from the description with reference to FIGS. 2 and 3, so its detailed description will be omitted.

In a variation of the embodiment of FIG. 4, terminal B transmits the received AR information to terminal A with the route guidance information.

Figure 5:
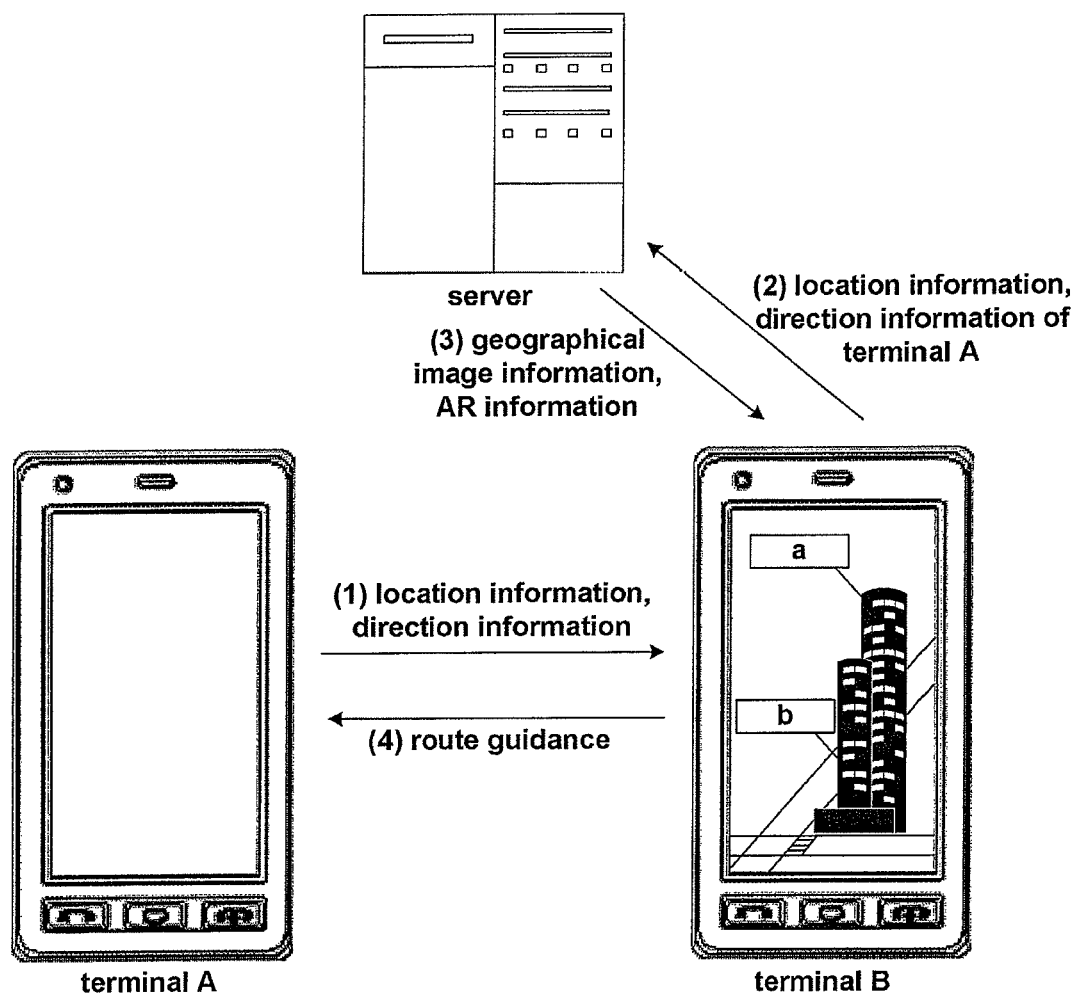
FIG. 5 is a view showing a third example of providing a route guidance by a mobile terminal according to an exemplary embodiment of the present invention.

(3) Another Example where a Guide Terminal Receives Location Information and Direction Information from a Target (i.e., to-be-Guided) Terminal FIG. 5 is a view showing a third example of providing a route guidance by a mobile terminal according to an exemplary embodiment of the present invention.

With reference to FIG. 5, the position-location module 115 of the terminal A acquires the location information (e.g., GPS information) of the terminal A, and the sensing unit 140 of the terminal A acquires direction information (e.g., azimuth information or terrestrial magnetism information) of the terminal A. The terminal A transmits the location information and direction information to the terminal B (guide terminal).

The wireless communication unit 110 of the terminal B transmits the location information and direction information of the terminal A, which have been received from the terminal A, to a certain server, and receives a surrounding image (geographical image information) and AR information corresponding to the location and direction of the terminal A from the server. The surrounding image (geographical image information) corresponding to the particular location and direction may be a real image (e.g., a road view image), a three-dimensional/two-dimensional image which has undergone a modeling process, a map image, and the like.

The terminal B displays the surrounding image (geographical image information) and AR information from the server together on the display unit 151. And, the terminal B provides a route guidance to the target terminal through various guiding means. Here, the guiding means may be at least one of a voice, a message, graphic data, a memo, a touch input, a keypad input, an arrow input, and a symbol input. The guiding means may be similarly understood from the description with reference to FIGS. 2 and 3, so its detailed description will be omitted.

Figure 6:
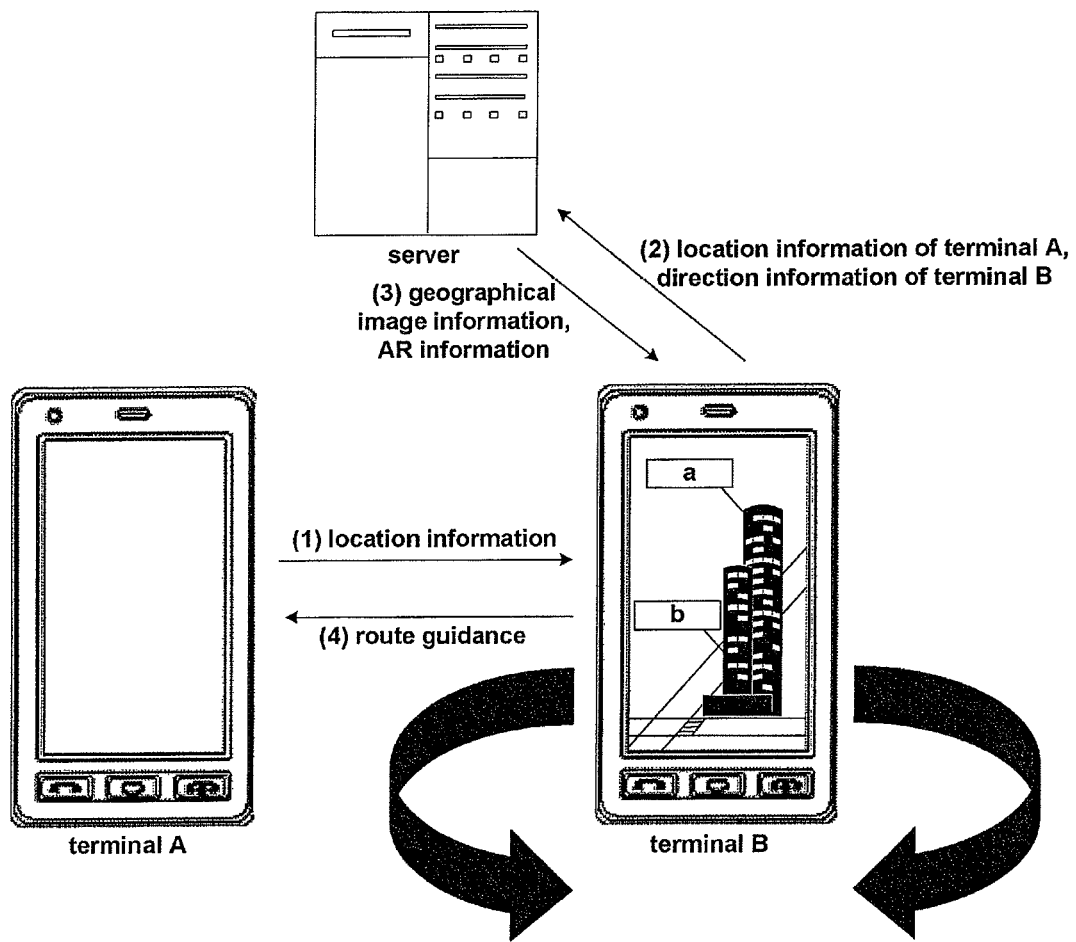
FIG. 6 is a view showing a fourth example of providing a route guidance by a mobile terminal according to an exemplary embodiment of the present invention.

(4) An Example where a Guide Terminal Receives, from a Server, Image Data and AR Information for a Target (i.e., to-be-Guided) Terminal FIG. 6 is a view showing a fourth example of providing a route guidance by a mobile terminal according to an exemplary embodiment of the present invention.

In comparing the exemplary embodiment of the present invention illustrated in FIG. 5 and the exemplary embodiment of the present invention illustrated in FIG. 6, in the exemplary embodiment of the present invention illustrated in FIG. 5, the terminal B transmits the location information and direction information of the terminal A to the server and receives the surrounding image (geographical image information) and AR information corresponding to the location and direction of the terminal A from the server. In comparison, in the exemplary embodiment of the present invention illustrated in FIG. 6, the terminal B transmits the location information of the terminal A and the direction information of the terminal B to the server and receives a surrounding image (geographical image information) and AR information corresponding to the location of the terminal A and the direction of the terminal B from the server.

Namely, in the exemplary embodiment of the present invention illustrated in FIG. 5, the surrounding image (geographical image information) and AR information received from the server are changed as the direction of the terminal A is changed, whereas in the exemplary embodiment of the present invention illustrated in FIG. 6, the surrounding image (geographical image information) and AR information received from the server are changed as the direction of the terminal B is changed.

In addition, in the exemplary embodiment of the present invention illustrated in FIG. 5, because the direction information of the terminal A is received, an explanation of the direction based on the terminal A can be possible, whereas in the exemplary embodiment of the present invention illustrated in FIG. 6, the direction information of the terminal A is not received but the direction information of the terminal B is used, so an explanation of the direction based on the terminal B can be possible.

Meanwhile, the direction information of the terminal B transmitted by the terminal B to the server can be determined in various manners.

In general, the direction of the terminal B acquired by the sensing unit 140 of the terminal B can be determined as the direction of the terminal B as it is.

Alternately, the result obtained by correcting the direction of the terminal B acquired by the sensing unit 140 of the terminal B according to a user manipulation through the user input unit 130 or the display unit 151 (touch screen) may be determined as the direction of the terminal B.

For example, in a state that the actual direction of the terminal B is fixed as the north, the direction information of the terminal B transmitted to the server may be changed to northwest by dragging a left portion on the display unit 151 (touch screen), or the direction information of the terminal B transmitted to the server may be changed to northeast by dragging a right portion on the display unit 151 (touch screen). Or, in a state that the actual direction of the terminal B is fixed as the north, the direction information of the terminal B transmitted to the server may be changed to northwest by manipulating a first manipulation unit of the user input unit 130, or the direction information of the terminal B transmitted to the server may be changed to northeast by manipulating a second manipulation unit of the user input unit 130.

Although not shown in FIG. 6, a change in the location of the terminal B may be considered a change in the location of the terminal A, and changed surrounding image (geographical image information) and AR information may be received from the server.

For example, the terminal B may additionally transmit displacement information of the terminal B (a distance offset from the original location of the terminal B to the changed location) along with the location information of the terminal A and the direction information of the terminal B. And, the terminal B may receive the surrounding image (geographical image information) and AR information corresponding to the result obtained by correcting the location information of the terminal A according to the displacement of the terminal B and the direction information of the terminal B from the server.

Alternatively, the terminal B may transmit the result obtained by directly correcting the location information of the terminal A according to the displacement of the terminal B and the direction information of the terminal B to the server and then receive the corresponding surrounding image (geographical image information) and AR information from the server.

An Example of Providing Route Guidance from a Guide Terminal to a Target Terminal Using a Specific Guide Location and Guidepost Landmark (e.g., Building)

Meanwhile, the terminal B may provide a route guidance with respect to the terminal A based on a guidepost landmark (e.g., building) or a guidepost location set by the user of the terminal B. such a route guidance may be initiated by a request from the terminal A or may be arbitrarily initiated by the terminal B.

In detail, when the user of the terminal B selects a certain location, the terminal B receives the surrounding image (geographical image information) and/or AR information corresponding to the certain location from the server, and in this state, when the user of the terminal B selects a guidepost landmark (e.g., building) in the midway point of the route along which the terminal A is moving toward a destination, the terminal B may transmit the guidepost location information building to the terminal A.

When the terminal A approaches the guidepost landmark (e.g., building) while on the move, it informs the terminal B accordingly. Upon receiving a notification from the terminal A, the terminal B may provide a route guidance in the same manner as described above or may provide a pre-set route guidance. The pre-set route guidance refers to transmission of a route guidance which is previously determined and stored (e.g., a previously recorded voice, a previously created message or memo, etc.) to the terminal A, rather than providing a route guidance to the terminal A in real time.

Figure 7:
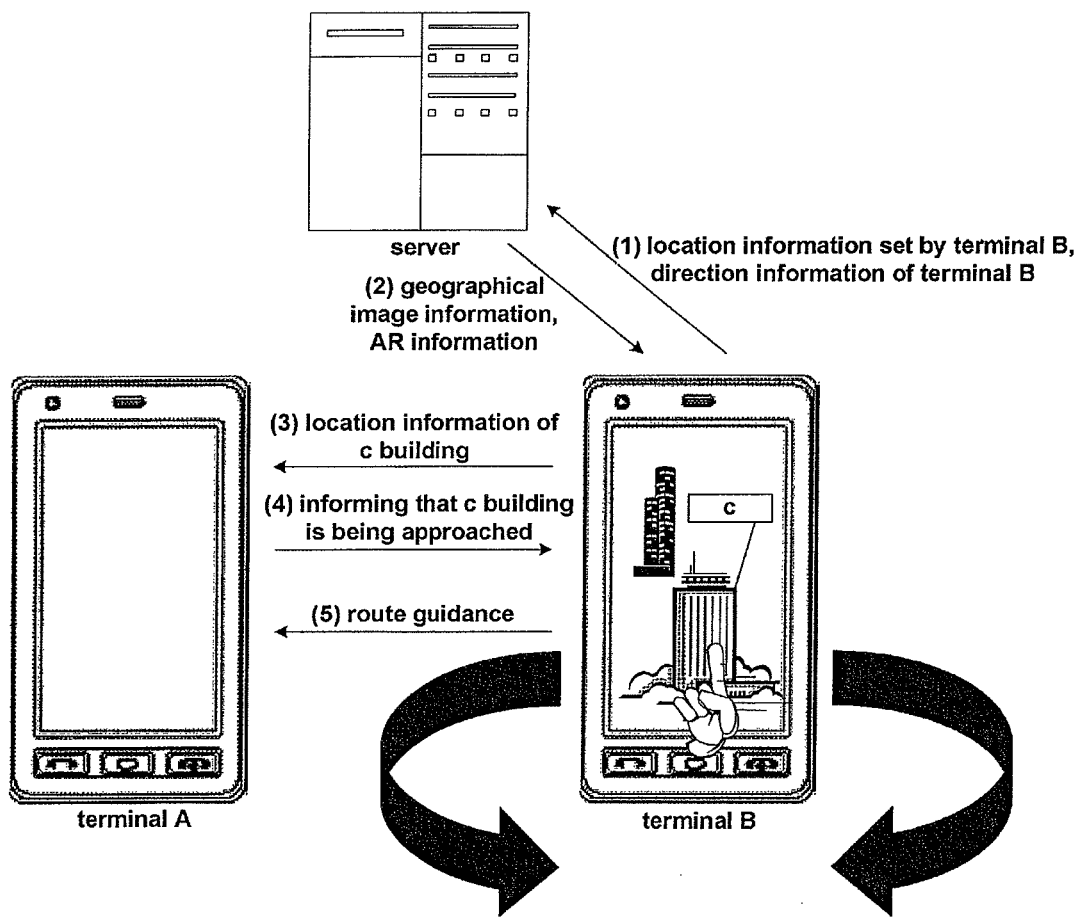
FIG. 7 is a view showing a fifth example of providing a route guidance by a mobile terminal according to an exemplary embodiment of the present invention.

FIG. 7 is a view showing a fifth example of providing a route guidance by a mobile terminal according to an exemplary embodiment of the present invention.

Although not shown in FIG. 7, the position-location module 115 of the terminal A may acquire the location information (e.g., GPS information) of the terminal A and transmit the acquired location information to the terminal B (guide terminal). The terminal B may transmit the location information of the terminal A which has been received from the terminal A to the server, and may determine the location of the terminal A upon receiving a surrounding image (geographical image information) corresponding to the location of the terminal A from the server.

With reference to FIG. 7, when the user of the terminal B selects a certain location (e.g., a certain location on the route to the destination from a current location of the terminal A), the wireless communication unit 110 of the terminal B transmits the selected location information and/or the direction information of the terminal B to the server and receives the surrounding image (geographical image information) and AR information corresponding to the selected location and/or the direction of the terminal B from the server. Here, the user of the terminal B can select the certain location by a user manipulation through the user input unit 130 or the display unit 151 (touch screen).

For example, the user of the terminal B may change the location information to be transmitted to the server by changing the geographical location displayed on the display unit 151 of the terminal B through a drag input on the display unit 151 (touch screen) of the terminal B. Or, the user of the terminal B may directly input location information (e.g., GPS information, latitude and longitude information, and the like) by manipulating the manipulation units of the user input unit 130 of the terminal B.

The terminal B displays the surrounding image (geographical image information) and AR information received from the server on the display unit 151. When the user of the terminal B selects a guidepost location (e.g., 'c building' in FIG. 7), the terminal B transmits the guidepost location information location to the terminal A.

The terminal A periodically checks its location through the position-location module 115 while on the move, and when it reaches within a certain distance range of the guidepost location (e.g., the 'c building' in FIG. 7), the terminal A transmits a notification message indicating that it is close to the guidepost location to the terminal B.

Upon receiving the notification message from the terminal A, the terminal B provides a route guidance to the target terminal through various guiding means. Or, upon receiving the notification message from the terminal A, the terminal B may provide a pre-set route guidance as described above to the terminal A. Here, the guiding means may be at least one of a voice, a message, graphic data, a memo, a touch input, a keypad input, an arrow input, and a symbol input. The guiding means may be similarly understood from the description with reference to FIGS. 2 and 3, so its detailed description will be omitted.

Meanwhile, if the route guidance is terminated due to communication interruption while the mobile terminal is providing the route guidance or is being provided with the route guidance, the mobile terminal may be recovered to a normal communication state and the route guiding method may be immediately performed from the beginning, or after a previous state which is temporarily stored is informed and then the route guiding method may be performed again according to a user selection.

Figure 8:
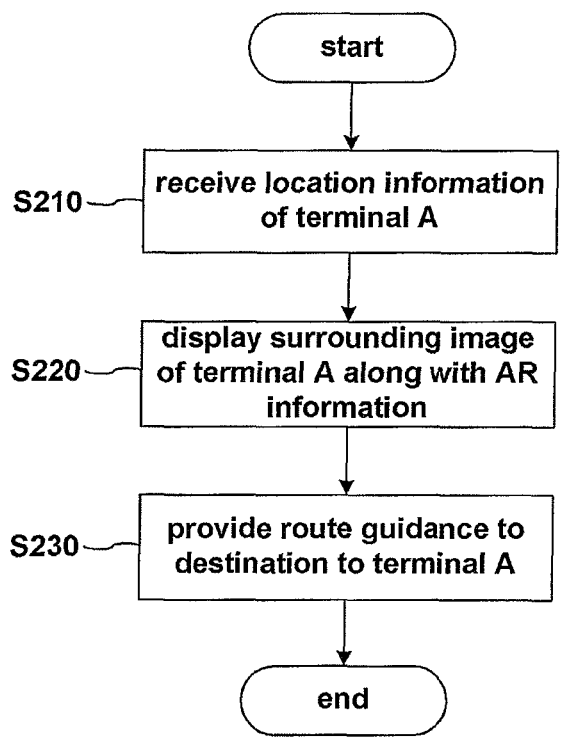
FIG. 8 is a first flow chart illustrating the process of a method for guiding a route by a mobile terminal according to a first exemplary embodiment of the present invention.

FIG. 8 is a flow chart illustrating the process of a method for guiding a route by a mobile terminal according to a first exemplary embodiment of the present invention.

With reference to FIG. 8, first, the terminal B receives location information of the terminal A from the terminal A (S210). Next, the terminal B visually displays a surrounding image of the terminal A along with AR information corresponding to the location of the terminal A (S220). And then, the terminal B provides a route guidance to the destination from the location of the terminal A to the terminal A (S230).

Here, the AR information may correspond to the location and direction of the terminal A. In addition, the route guidance may be carried out by a voice, a text message, graphic data, or any of their combinations.

The method for guiding route of a mobile terminal according to an exemplary embodiment of the present invention can be understood similarly from the description of the mobile terminal according to an exemplary embodiment of the present invention above with reference to FIGS. 1 to 7, so a detailed description thereof will be omitted.

Figure 9:
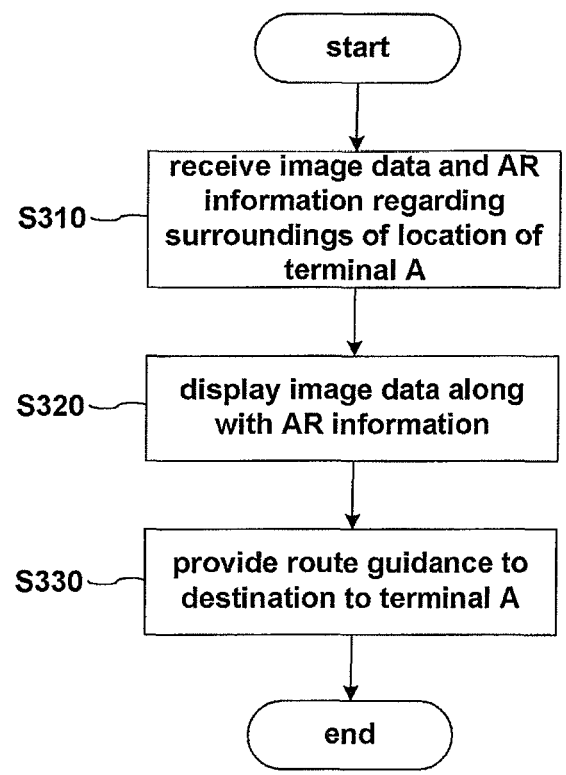
FIG. 9 is a second flow chart illustrating the process of a method for guiding a route by a mobile terminal according to a second exemplary embodiment of the present invention.

FIG. 9 is a flow chart illustrating the process of a method for guiding a route by a mobile terminal according to a second exemplary embodiment of the present invention.

With reference to FIG. 9, first, the terminal B receives image data with respect to the surroundings of the location of the terminal A and AR information regarding the surroundings from the terminal A (S310).

Here, the image data with respect to the surroundings of the location of the terminal A may be image frame data captured by the terminal A (e.g., a camera provided in the terminal A). Also, the terminal A may transmit the location information and the direction information of the terminal A to the certain server, and receive the AR information corresponding to the location information and the direction information.

In addition, the terminal B may receive an image obtained by synthesizing a graphic image implementing image data and a graphic image indicating AR information.

Next, the terminal B visually displays the image data along with the AR information regarding the surroundings of the location of the terminal A (S320). And then, the terminal B provides a route guidance from the location of the terminal A to the destination to the terminal A (S330).

Figure 10:
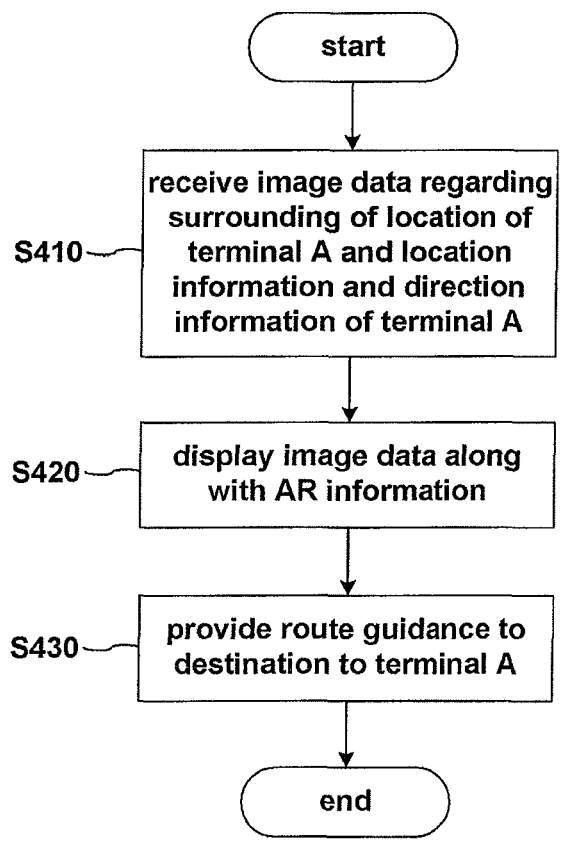
FIG. 10 is a third flow chart illustrating the process of a method for guiding a route by a mobile terminal according to a third exemplary embodiment of the present invention.

FIG. 10 is a flow chart illustrating the process of a method for guiding a route by a mobile terminal according to a third exemplary embodiment of the present invention.

With reference to FIG. 10, the terminal B receives image data with respect to the surroundings of the location of the terminal A and location information and direction information of the terminal A from the terminal A (S410). Here, the image data with respect to the surroundings of the location of the terminal A may be image frame data captured by the terminal A (e.g., the camera provided in the terminal A). Also, the location information may be global positioning system (GPS) information, and the direction information may be azimuth information or terrestrial magnetism information.

Next, the terminal B visually displays the image data with respect to the surroundings of the location of the terminal A along with the AR information corresponding to the location and direction of the terminal A (S420). Here, the terminal B may synthesize and display a graphic image indicating the AR information and a graphic image implementing the image data. Also, the terminal B may receive the AR information corresponding to the location information and the direction information of the terminal A from the certain server.

And then, the terminal B provides a route guidance from the location of the terminal A to the destination to the terminal A.

Figure 11:
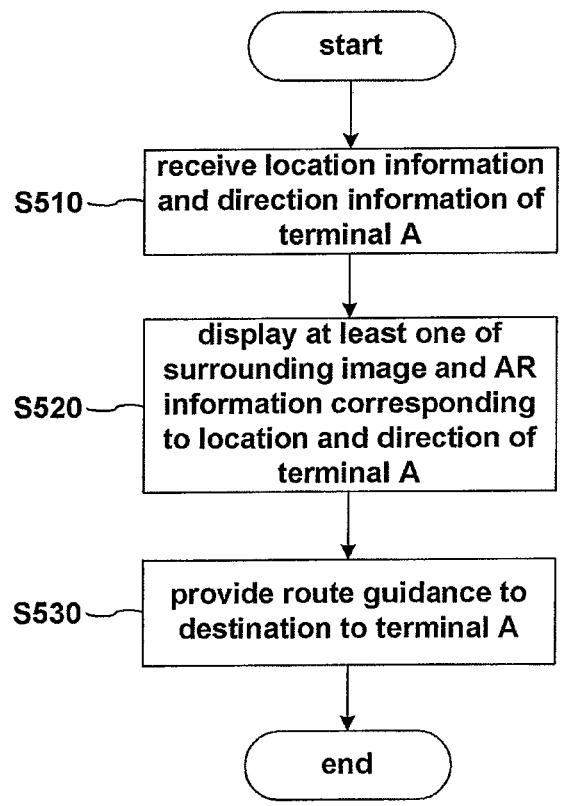
FIG. 11 is a fourth flow chart illustrating the process of a method for guiding a route by a mobile terminal according to a fourth exemplary embodiment of the present invention.

FIG. 11 is a flow chart illustrating the process of a method for guiding a route by a mobile terminal according to a fourth exemplary embodiment of the present invention.

With reference to FIG. 11, first, the terminal B receives location information and direction information of the terminal A from the terminal A.

Next, the terminal B visually displays at least one of the surrounding image (geographical image information) corresponding to the location and direction of the terminal A and AR information (S520). Here, the terminal B may receive the surrounding image (geographical image information) and the AR information corresponding to the location information and direction information of the terminal A from the certain server. Also, the location information may be global positioning system (GPS) information, and the direction information may be azimuth information.

And then, the terminal B provides a route guidance from the location of the terminal A to the destination to the terminal A (S530).

Figure 12:
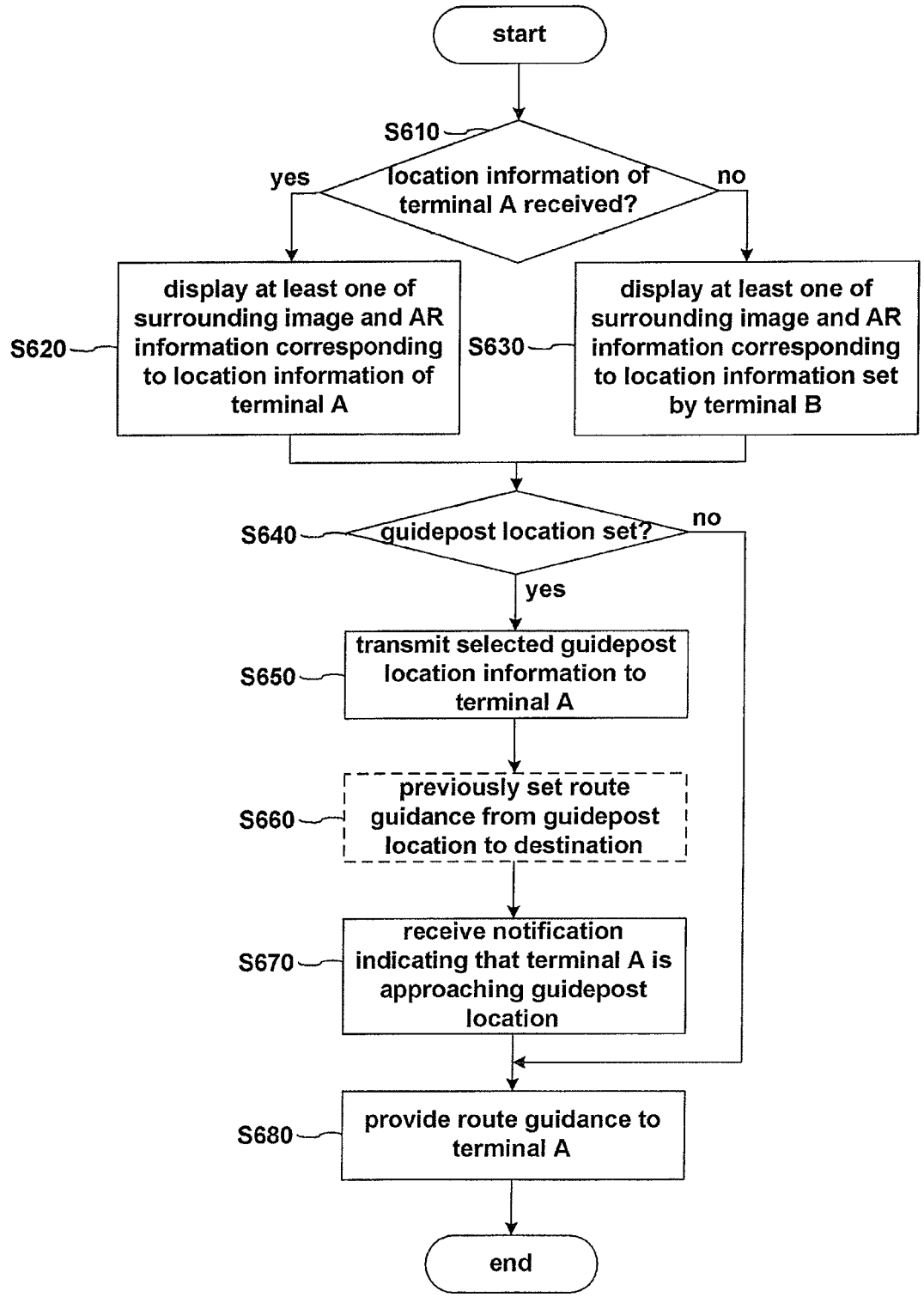
FIG. 12 is a fifth flow chart illustrating the process of a method for guiding a route by a mobile terminal according to a fifth exemplary embodiment of the present invention.

FIG. 12 is a flow chart illustrating the process of a method for guiding a route by a mobile terminal according to a fifth exemplary embodiment of the present invention.

With reference to FIG. 12, the terminal B may receive location information of the terminal A from the terminal A (S610) and visually display at least one of a surrounding image (geographical image information) and AR information corresponding to the location information of the terminal A (S620).

Or, the terminal B may visually display at least one of the surrounding image (geographical image information) and the AR information corresponding to a location arbitrarily set by the terminal B itself (S630).

Here, the terminal B may receive the surrounding image (geographical image information) and the AR information corresponding to the location information of the terminal A or the location information arbitrarily set by the terminal B from the certain server.

Or, the terminal B may receive the surrounding image (geographical image information) and the AR information corresponding to the location information of the terminal A or the direction information of the terminal B from the certain server. In this case, the direction information of the terminal B may be a result obtained by correcting an actual direction of the terminal B correspondingly according to a user input of the terminal B.

When the terminal B does not set a guidepost location (S640), the terminal B provides a route guidance from the location of the terminal A to the destination to the terminal A (S680), as described above.

When the terminal B sets a guidepost location, the terminal B may transmit the guidepost location selected by the user of the terminal B or location information of a guidepost building to the terminal A (S650) and receive a notification or message indicating that the terminal A approaches or reaches the guidepost location from the terminal A (S670). In this case, the terminal B may previously set a route guidance from the guidepost location to the destination (S660), and when the terminal B receives the message indicating that the terminal A approaches or reaches the guidepost location from the terminal A, the terminal B may provide the pre-set route guidance to the terminal A (S680).

In the embodiments of the present invention, the above-described method can be implemented as codes that can be read by a computer in a program-recorded medium. The computer-readable medium includes various types of recording devices in which data read by a computer system is stored. The computer-readable medium may include a ROM, a RAM, a CD-ROM, a magnetic tape, a floppy disk, an optical data storage device, and the like. The computer-readable medium also includes implementations in the form of carrier waves or signals (e.g., transmission via the Internet).

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method of providing route guidance information to a mobile terminal, comprising:
    capturing, by a camera, image data;
    generating at least one of location information of the mobile terminal and direction information of the mobile terminal;
    transmitting information to a remote device, the information including the at least one of the image data, the location information, and the direction information;
    receiving augmented reality information from the remote device, the augmented reality information based on the at least one of the image data, the location information, and the direction information of the mobile terminal;
    transmitting the augmented reality information overlapped with the image data to another device so as to receive route guidance information from the another device;
    receiving the route guidance information from the another device, wherein the route guidance information includes graphic data; and
    displaying the graphic data synthesized with the augmented reality information overlapped with the image data.

2. The method of claim 1, wherein the mobile terminal is a first mobile terminal, the another device is a second mobile terminal and the remote device is a server.

3. The method of claim 2, wherein the step of receiving route guidance information from the another device comprises:
    receiving the route guidance information for a route between an intermediate destination and a final destination after transmitting a notice from the first mobile terminal indicating that the first mobile terminal is in proximity to the intermediate destination.

4. The method of claim 2, wherein the step of receiving route guidance information is preceded by the step of transmitting the received augmented reality information to the another device.

5. The method of claim 1, wherein the route guidance information is one of voice information, a message, a memo, a symbol, a diagram, and an image.

6. An apparatus of providing route guidance information to a mobile terminal, comprising:
    a wireless transceiver;
    a navigation device;
    a camera configured to capture image data;
    a controller operatively connected to the wireless transceiver and the navigation unit, the controller configured to
        generate at least one of location information of the apparatus and direction information of the apparatus,
        transmit information to a remote device, the information including the at least one of the image data, the location information and the direction information,
        receive augmented reality information from the remote device, the augmented reality information based on the at least one of the image data, the location information and the direction information of the apparatus, transmit the augmented reality information overlapped with the image data to another device so as to receive route guidance information from the another device, and receive the route guidance information from the another device, wherein the route guidance information includes graphic data; and a display configured to display the graphic data synthesized with the augmented reality information overlapped with the image data.

7. The apparatus of claim 6, further comprising:
wherein the apparatus is a first mobile terminal, the another device is a second mobile terminal and the remote device is a server.

8. The apparatus of claim 7, wherein the controller is configured to receive the route guidance information for a route between an intermediate destination and a final destination after transmitting a notice indicating that the first mobile terminal is in proximity to the intermediate destination.

9. The apparatus of claim 7, wherein the controller is configured to transmit the received augmented reality information to the another device before receiving the route guidance information.

10. The apparatus of claim 6, wherein the route guidance information is one of voice information, a message, a memo, a symbol, a diagram, and an image.

11. An apparatus of providing route guidance information to a mobile terminal, comprising:
a wireless transceiver;
a display;
a navigation device; and
a controller operatively connected to the wireless transceiver, the display and the navigation unit, the controller configured to
receive, from a first terminal, at least one of image data taken by a camera of the first mobile terminal, location information of the first mobile terminal and direction information of the first mobile terminal, transmit information to a remote device, the information including the at least one of the image data, the location information and the direction information, receive augmented reality information from the remote device, the augmented reality information based on the at least one of the image data, the location information and the direction information of the first mobile terminal, synthesize graphic data with the augmented reality information overlapped with the image data, wherein the graphic data is related to route guidance information, and transmit the graphic data with the augmented reality information overlapped with the image data to the first mobile terminal.

12. The apparatus of claim 11, wherein the controller is configured to transmit the received augmented reality information to the first mobile terminal.

13. The apparatus of claim 11, wherein the at least one of the location information of the first mobile terminal and the direction information of the first mobile terminal is both of the location information of the first mobile terminal and the direction information of the first mobile terminal.

14. The apparatus of claim 11, wherein the controller is configured to receive an image corresponding to the augmented reality information from the remote device.

15. The apparatus of claim 11, wherein the controller is configure to transmit the route guidance information for a route between an intermediate destination and a final destination after receiving a notice from the first mobile terminal indicating that the first mobile terminal is in proximity to the intermediate destination.

16. The apparatus of claim 11, wherein the route guidance information is one of voice information, a message, a memo, a symbol, a diagram, and an image.

* * * * *